(12) United States Patent
Klugger et al.

(10) Patent No.: US 10,259,091 B2
(45) Date of Patent: Apr. 16, 2019

(54) MEASURING SYSTEM FOR MEASUREMENT ON TOOLS IN A MACHINE TOOL

(71) Applicants: Martin Klugger, Gruenkraut (DE); Andreas Hildebrand, Ravensburg (DE); Norbert Moersch, Wangen (DE)

(72) Inventors: Martin Klugger, Gruenkraut (DE); Andreas Hildebrand, Ravensburg (DE); Norbert Moersch, Wangen (DE)

(73) Assignee: BLUM-NOVOTEST GmbH (DE)

(*) Notice: Subject to any disclaimer, the term of this patent is extended or adjusted under 35 U.S.C. 154(b) by 0 days.

(21) Appl. No.: 15/790,791

(22) Filed: Oct. 23, 2017

(65) Prior Publication Data
US 2018/0111240 A1 Apr. 26, 2018

(30) Foreign Application Priority Data
Oct. 24, 2016 (DE) .................. 10 2016 012 727

(51) Int. Cl.
*B23Q 17/24* (2006.01)
*G01B 21/04* (2006.01)
*G01B 11/24* (2006.01)

(52) U.S. Cl.
CPC ..... *B23Q 17/2428* (2013.01); *B23Q 17/2461* (2013.01); *B23Q 17/2485* (2013.01);
(Continued)

(58) Field of Classification Search
CPC ............ Y10T 409/303584; G01V 8/12; G01D 5/342; G01N 21/952; B23Q 17/2428;
(Continued)

(56) References Cited

U.S. PATENT DOCUMENTS 3,900,738 A * 8/1975 McKay, Sr. ............ G01D 5/342
   250/559.14
5,004,930 A 4/1991 Gremaud et al.
(Continued)

FOREIGN PATENT DOCUMENTS

DE  102008017349 A1  10/2009
EP     1050368 A1  11/2000
EP     1587648 B1  10/2005

OTHER PUBLICATIONS

Espacenet English translation of DE 102008017349.*
Micro-Epsilon, Betriebsanleitung, optoCONTROL 1200/1201.
Marposs—MidaLaser (2004), Blum Novotest.

*Primary Examiner* — Mohamed K Amara
(74) *Attorney, Agent, or Firm* — Tarolli, Sundheim, Covell & Tummino LLP (57) ABSTRACT

A contactlessly measuring system having a contactlessly measuring device, with a light transmitter portion and a light receiver portion, for determining the position of a tool or for determining the longest cutting edge of a rotating tool in a tool machine. A light barrier system is formed by the light transmitter portion and the light receiver portion, each being associated with a leg of an essentially U-shaped support structure of the measuring device. A fluid blowing device, associated with the measuring device, is provided for cleaning a tool to be measured, and/or a sealing air feed is provided in the area of a measuring beam of the measuring device designed as a light barrier measuring system, and/or a protective/closing device is provided at the light transmitter portion and/or the light receiver portion of the measuring device designed as a light barrier measuring system.

13 Claims, 6 Drawing Sheets

(52) U.S. Cl.
CPC ........ *G01B 11/2433* (2013.01); *G01B 21/047* (2013.01); *B23Q 2717/00* (2013.01)

(58) Field of Classification Search
CPC ............ B23Q 17/2461; B23Q 2717/00; B23Q 17/2485; B23Q 17/0938; B23Q 17/20; B23Q 17/24; B24B 49/12; B24B 13/005; B24B 47/22; G01B 11/005; G01B 11/028; G01B 21/047
See application file for complete search history.

(56) References Cited

U.S. PATENT DOCUMENTS

| | | | | |
|---|---|---|---|---|
| 7,315,018 B2* | 1/2008 | Ashton | ................. | B23Q 17/09 250/221 |
| 8,790,155 B2* | 7/2014 | Stroppel | ................. | B24B 5/01 451/10 |
| 2002/0176756 A1* | 11/2002 | Gottschald | ............. | B24B 9/148 409/132 |
| 2003/0112448 A1* | 6/2003 | Maidhof | ............... | G01B 11/002 356/603 |
| 2006/0232791 A1* | 10/2006 | Turrini | .................. | B23Q 17/22 356/621 |
| 2008/0250625 A1* | 10/2008 | Slettemoen | ............ | B23Q 17/22 29/407.04 |
| 2010/0286812 A1* | 11/2010 | Slettemoen | ............ | B23Q 17/09 700/160 |
| 2011/0009031 A1* | 1/2011 | Honegger | .......... | B23Q 17/2419 451/6 |
| 2012/0246953 A1* | 10/2012 | Engel | ................... | G01B 21/045 33/502 |
| 2013/0019735 A1* | 1/2013 | Koeder | ................ | B23D 59/001 83/697 |
| 2013/0292706 A1* | 11/2013 | Costello | ................ | H01L 31/167 257/82 |
| 2016/0003751 A1* | 1/2016 | Reiz | .................... | G01N 21/952 356/237.2 |
| 2016/0346956 A1* | 12/2016 | Takekawa | ............. | B28D 7/005 |
| 2018/0112971 A1* | 4/2018 | Jensen | ................. | G01B 11/026 |
| 2018/0128604 A1* | 5/2018 | Wogerbauer | ........... | G01B 11/26 |

* cited by examiner

MEASURING SYSTEM FOR MEASUREMENT ON TOOLS IN A MACHINE TOOL

RELATED APPLICATIONS

This application claims priority from German Patent Application Serial No. 10 2016 012 727.9, filed 24 Oct. 2016, which is incorporated herein in its entirety.

BACKGROUND

A measuring system for contactless or tactile measurement on tools in a machine tool is described below. These types of measuring systems are to be used in machine cutting or material-removing machining (for example, milling, turning, grinding, planning, drilling, countersinking, reaming, eroding, and the like), also in combined lathe/milling machines or milling/turning machines with stationary or rotating tools. Features and properties of the measuring system are defined in the claims; however, the description and figures also disclose characteristics of the measuring system and its various aspects.

PRIOR ART

Previous laser systems for measurement on tools have one or more pneumatic feed and discharge lines for providing sealing air, controlling a passage for laser light, and cleaning the tool, etc. In addition, they require electrical lines for providing the power supply and the operating signals (voltage supply of the control system, laser activation, measuring signals, etc.). The same applies for tactilely measuring measuring systems in machine tools.

Measuring systems of this type are usually installed on a machine table of the machine tool, inside the working space thereof. To keep the working space as free as possible or also to avoid creation of areas in which the moving tools could collide, in some designs the measuring systems are also moved into a measuring position situated in the working space via a pivoting or linear unit, and after the measuring operation on the tool, are moved back into a parked/neutral position outside the working space. In simpler variants, the measuring system as a whole is disassembled if it is not needed on a regular basis in certain production processes.

These measuring systems generally represent a space-consuming interference contour in the working space of the machine and limit the usable space, or they represent a constant collision risk. Thus, these measuring systems are exposed to the risk of damage by large workpieces, chips, or also tools. In addition, they require one or more lines in the working space of the machine.

Providing, laying, and installing the supply and control lines (compressed air and electrical lines) represents a significant level of effort, in particular also for movable or pivotable measuring systems; the precisely fitted installation of the measuring system as well as the connection of the pneumatic/electrical connectors is also complicated. Multiple pneumatic lines and multiple electrical lines are generally required for connecting the measuring system to the machine controller of the machine tool.

The optoCONTROL 1200/1201 light quantity sensor from MICRO-EPSILON Eltrotec GmbH (www.micro-epsilon.com) is used for gap, edge, and light quantity measurement, and is made up of a light source and a separate receiver unit. The control electronics system is accommodated in the receiver housing. The receiver unit and the light source are installable separate from one another, and are operated via separate supply and output cables. A pneumatic supply is not provided in this measuring system.

An interchangeable Pick Up Tool Setter 35.40 from m&h Inprocess Messtechnik GmbH (www.mh-inprocess.com) with infrared data transmission represents an approach that does not have an interference contour or cables. This tactile measuring system is manually or automatically changeable in an interchangeable holder that is flange-mounted on the side of the work table. The measuring system is pushed from the outside into a self-centering mounting, where it engages. After the tactile measurement of the tool, the measuring system may be pulled from the mounting. Likewise, no pneumatic lines are provided in this measuring system; therefore, it is comparable only to a limited extent to the measuring system of the type considered here.

One example of a contactlessly measuring tool scanner in the form of a laser measuring section is known from DE 10 2008 017 349 A1, for example. Such a measuring system is used for measurement on tools in a machine tool. It has a light barrier system, for example for determining the position of a tool or for determining the longest cutting edge of a rotating tool in the machine tool. The measuring system has a pneumatic controller for providing compressed air in the measuring system for various functions (purging the laser beam transmitter and laser beam receiver, opening/closing protective covers in front of the laser beam transmitter and laser beam receiver), and at least one electronic controller for operating the light barrier system, for receiving measuring signals from the light barrier system, for delivering measuring signals in a signal transmission medium to the machine controller, and for providing control signals for the pneumatic controller. A variant of a measuring system for contactless measurement on tools in a machine tool is known from the cited document, which manages without electrical connectors due to the fact that the electrical supply energy is provided by means of a fluid electrical converter, which is fed with compressed air from a pneumatic source that is required for other reasons. This reduces the complexity, as well as any sources of error in the electrical connection.

Object

On this basis, the object is to provide an approach for simplified, reliable handling of a measuring system for measurements on stationary or rotating material-removing tools in a machine tool.

Achievement of the Object

This object is achieved by the contactlessly measuring measuring system set forth in Patent Claim 1. This contactlessly measuring measuring system is equipped with a contactlessly measuring measuring device, having a light transmitter portion and a light receiver portion, for determining the position of a tool or for determining the longest cutting edge of a rotating tool in a machine tool. A light barrier system is formed by the light transmitter portion and the light receiver portion, each being associated with a leg of an essentially U-shaped support structure of the measuring device. A fluid blowing device associated with the measuring device is provided for cleaning a tool to be measured, and/or a sealing air feed is provided in the area of a measuring beam of the measuring device designed as a light barrier measuring system, and/or a protective/closing device is provided at the light transmitter portion and/or the light receiver portion of the measuring device designed as a light barrier measuring system.

In one variant, the measuring system is to be connected to and used with a multipurpose interface socket for accommodating and for connecting the above-mentioned light barrier measuring system. In the following discussion, the contactless measuring measuring system without the multipurpose interface socket is also referred to as a measuring device.

The multipurpose interface socket has the following features:
- at least one mechanical stop, corresponding to a counter-stop on the measuring device, for accommodating and repeatably placing the measuring device on the multipurpose interface socket;
- at least one second signal transfer point on the multipurpose interface socket, which corresponds to a first signal transfer point on the measuring device; and/or
- at least one second fluid transfer point on the multipurpose interface socket, which corresponds to a first fluid transfer point on the measuring device.

This multipurpose interface socket provides a mechanical connection, an electrical/optical signal connection, and/or a pneumatic fluid connection between the machine controller of the machine tool and the measuring device. The mechanical interface may have a user-friendly design, for example as a screw, detent, rotational, or clamp fixing means, or as a dovetail or bayonet connection. This interface provides mechanically repeatable measuring device placement. Pre-tensioned pins or dowel pins are able to compensate for fairly small tolerances between the multipurpose interface socket and the measuring device. Spring steel sheets or magnetic couplings are also usable as connection components. For this purpose, the multipurpose interface socket may have one or more, preferably surface-finished, contact surfaces, or one or more preferably resilient alignment pins.

The mechanical stop may be designed in such a way that the measuring device is to be connected to the multipurpose interface socket in two different orientations that are rotated by 180°.

In the multipurpose interface socket, in one variant the second signal transfer point has a first and a second contact point, each with multiple contacts. These contacts may be electrical (ohmic) and/or fiber optic-assisted connectors or contacts. The first and second contact points are spaced apart from one another, and the multiple contacts of one contact point are situated point-symmetrically with respect to the multiple contacts of the other contact point, relative to a center between the two contact points. The measuring device has diametrically opposed first and second contact points. It is thus possible to very conveniently connect the measuring device to the multipurpose interface socket in two different orientations that are rotated by 180°. The signal/supply voltage contacts are provided in parallel due to the two diametrically opposed first and second contact points. This also reduces configuration errors during operation, since each signal transfer takes place twice. Lines via which fairly large currents are conducted (the power supply, for example) are transferred, as needed, via 2×2, 2×3, or more individual contacts.

In one embodiment as a contact transfer, for connection to the measuring device this multipurpose interface socket has a printed circuit board with gold-plated contact points on one side (measuring device or socket), and has contact pins or contact springs on a corresponding side (socket or measuring device). Mixed forms within this distribution are also possible. The contact pins or contact springs may be soldered via surface mount technology (SMT), riveted, or soldered on or soldered in; the contact pins may also have a resilient design. The printed circuit board transfers/accepts the signal lines and supply lines to/from the contact pins or contact springs.

Furthermore, in one variant the multipurpose interface socket has a seal arrangement which surrounds the signal transfer point and the fluid transfer point, and which corresponds to a lateral or lower contact surface of the measuring device. This seal arrangement may be designed as a ring seal which keeps coolant and dirt away from the interface when the measuring device is installed.

When the measuring device is not connected to the multipurpose interface socket, the particular circuit board with its exposed electrical/fiber optic contacts forms the outer skin of the measuring device and of the multipurpose interface socket in the area of the transfer point. For this purpose, the circuit board is designed without openings, and is to be installed in the socket or measuring device housing in a fluid/dust-tight manner. Thus, when the measuring device is not docked on the multipurpose interface socket, dust, coolant, or lubricant cannot enter the interior of the housing of the measuring device or of the multipurpose interface socket.

If chips, dust, or coolant should reach the interface when the transfer point of the multipurpose interface socket is exposed, i.e., without the measuring device docked thereon, it is virtually impossible to clean the contact pins, having the gaps, in their mounting.

To prevent penetration of the contaminants, in different variants it is provided that sealed contact points are formed by means of one or more sealing diaphragms. The interfaces designed in this way, together with the housing of the measuring device/the multipurpose interface socket, in each case form a surface that is essentially completely closed and easy to clean.

The two contact points on the interface socket and the measuring device may thus have an outwardly sealed design. In one variant, SMT-solderable spring contact pin blocks are provided for this purpose. In another variant, SMT-soldered or riveted contact springs are used. For cleaning, these systems may easily be blown off with cleaned (dust- and oil-free) compressed air via a nozzle in the event that coolant, for example, reaches the contact point before the measuring device is mounted on the multipurpose interface socket.

The counterpiece for the (resilient) contacts forms the above-mentioned printed circuit board with the corresponding number of gold-plated hardened contact surfaces. The resilient contacts may be situated either on the bottom side of the measuring device, and the circuit board with the contact surfaces may be situated on the top side of the multipurpose interface socket. In one preferred variant, the resilient contacts are situated on the bottom side of the measuring device, and the contact surfaces are situated on the top side of the multipurpose interface socket.

In another variant, the contacts are sealed off by means of a flexible diaphragm in which the individual contacts are embedded, or which tightly encloses the individual contacts on the side. The transfer interface is thus sealed off from penetrating coolant when the measuring device is not mounted. In this case, the transfer interface is exposed, and if the contact arrangement were not seal-tight, lubricant or coolant could penetrate into the interior of the multipurpose interface socket during operation of the machine tool.

When the contacts (preferably on the measuring device) are sealed off by means of the flexible diaphragm, lubricant or coolant cannot enter the interior of the multipurpose interface socket. The multipurpose interface socket is sealed off by the printed circuit board, so that dust or liquid cannot penetrate into the multipurpose interface socket.

The spring contact pins mentioned above have movable parts with gaps, through which lubricant or coolant could possibly enter the interior of the multipurpose interface socket. Complete removal of the lubricant or coolant from the interior of the multipurpose interface socket is virtually impossible. The additional sealing diaphragm protects the contacts from coolant, and simplifies cleaning of the electrical interface. In this regard, the sealed-off variant of the contacts is preferred.

A distinction is to be made between the above-mentioned sealing of the interface area by the seal arrangement (ring seal) and the sealing of the two contact points from the outside; one may be provided as an alternative to the other, or both may be provided.

In one variant, the multipurpose interface socket has a pneumatic controller, comprising pneumatic components such as valves, throttles, check valves, filter capsules, and/or pressure reducers or the like for providing pressurized fluid for various functions in the light barrier system, for example the closure diaphragms, to be actuated pneumatically, for the light beam in the light barrier system. One advantage of this variant is that the multipurpose interface socket requires only a single fluid supply. From this one fluid supply, the functions of cleaning, closure pistons, and sealing air for the light barrier measuring system are provided in the multipurpose interface socket via three fluid transfer points. In variants in which the multipurpose interface socket contains no pneumatic components, the pneumatic controller of the functions of cleaning, closure pistons, and sealing air for the light barrier measuring system is situated either in the light barrier measuring system, or upstream from the multipurpose interface socket. In the first case, only one fluid supply and one fluid transfer point is required in the multipurpose interface socket. In the second case, three separate fluid supplies for the functions of cleaning, closure pistons, and sealing air, and three corresponding fluid transfer points, are provided in the multipurpose interface socket.

In another variant, in addition to or instead of the pneumatic controller an electronic controller is present for providing control signals for operating the light barrier system, for receiving measuring signals from the light barrier system, for delivering measuring signals in a signal transmission medium to the machine controller, and/or for providing control signals for the pneumatic controller in the multipurpose interface socket. The multipurpose interface socket may have different connections on one of its sides and/or base surface. In another variant, the multipurpose interface socket may be provided with a seal arrangement facing the machine table. The multipurpose interface socket is thus easily mountable on the machine table, and may also remain there during the manufacturing operation. By use of the multipurpose interface socket, in many applications it is very easy to install the measuring device on a machine table, a pallet, or in the working space of a CNC machine.

The multipurpose interface socket is used as a pre-installation on the machine tool, and represents a simple preparation option for machine tools. Prior to start-up of the machine tool, the multipurpose interface socket may already be completely mounted and, connected to the machine controller, installed in the machine tool. Thus, despite the very harsh environmental conditions that prevail in the machine room, it is easy for the user to use the measuring device and directly put it into operation. It is thus possible for the customer to adapt a measuring device without endangering the seal-tightness of the system, and without having to ensure that the machine table is sealed off. Due to the multipurpose interface socket, the measuring system is quickly and easily exchangeable by the user.

In another variant, the measuring device is supplied through the multipurpose interface socket via a pneumatic line, which in the case of a laser measuring section also supplies a blow nozzle for tool cleaning situated on the measuring device or the multipurpose interface socket, directly via the interface. Thus, no additional external line is necessary. In addition, instead of the laser measuring section, the multipurpose interface socket may accommodate a tactile tool probe, with or without a blow nozzle, for cleaning the measuring surface.

In particular in one variant of the measuring device in which the laser measuring section is protected from soiling by pneumatically operated closure pistons or closure diaphragms, the valve vent and/or exhaust air of the closure pistons is supplied to the blow nozzle for tool cleaning. Thus, no additional exhaust air duct or additional exhaust air opening on the measuring device or the multipurpose interface socket is necessary. It is thus advantageously avoided that the measuring device or the multipurpose interface socket, present in the machining space of machine tools that is heavily loaded with mist, fluids, or solids, has to be provided with an exhaust air opening. Instead, the pneumatic control system is effectively protected from penetrating lubricant or coolant by a check valve installed in the blow nozzle for tool cleaning.

In another variant, an electrical line that establishes the electrical connection from the machine room to the machine controller is designed in such a way that the exhaust air can escape through same. This may take place, for example, via a thin air tube that is incorporated into the cable.

A separate cover plate that covers (i) the electrical and/or fiber optic signal transfer point and (ii) the fluid transfer point and (iii) the seal arrangement may be provided for protecting the interface when a measuring device is not mounted on the multipurpose interface socket.

For supplying the fluid blowing device, the pneumatic controller may have a first, electromagnetically actuatable switch valve that is to be acted on by electrical actuating signals; the first, electromagnetically actuatable switch valve may deliver compressed air in a controlled manner to one or more air outlets of the fluid blowing device, for example for cleaning a tool to be measured. This switch valve may have an electromagnetically actuated throughflow position in which the blowing air outlets are fed with compressed air, and a spring-loaded blocked position in which no compressed air reaches the blowing air outlets.

For supplying sealing air in the area of the measuring beam, the pneumatic controller may have a second, electromagnetically actuatable switch valve that is to be acted on by actuating signals. This switch valve may allow compressed air to exit in a controlled manner at the passage openings for the measuring beam so that foreign bodies cannot enter the beam path of the (laser) light beam. The second, electromagnetically actuatable switch valve may have a spring-loaded blocked position, in which no compressed air can exit at passage openings for the measuring beam, and an electromagnetically actuated throughflow position, in which compressed air may exit at the passage openings for the measuring beam.

For feeding the at least one protective/closing device with fluid, the pneumatic controller may have a third, electromagnetically actuatable switch valve to be acted on by actuating signals. The closure diaphragms or closure pistons may be situated in the protective/closing device. This electromagnetically actuatable switch valve delivers compressed air in a controlled manner to one or more sliders. This switch valve may have a spring-loaded blocked position, in which no compressed air reaches the sliders at the light transmitter portion or the light receiver portion of the light barrier system, so that a measuring light beam cannot pass through, and an electromagnetically actuated throughflow position, in which the sliders are fed with compressed air so that the measuring light beam can pass through.

In another variant, the at least one protective/closing device for the light path is detachably connected to the laser measuring section. For this purpose, in each case a pneumatically operated closure piston is situated in an attachment containing a light beam through opening. The attachment is provided with a rotary, slide, or detent connection that is configured for cooperating with a corresponding connection at the support structure of the laser measuring section. In one variant of the attachment, the pneumatically operated closure piston and the light beam through opening are situated in such a way that in the mounted state of the attachment and of the laser measuring section on the multipurpose interface socket, the light beam through opening is closer to a free end (upper end) of the particular leg of the support structure of the laser measuring section than to the (lower end of the) multipurpose interface socket. In one variant of the attachment, the attachment has a wall which, on its side closer to the upper end, is sloped with respect to the light beam. This increases the possible submersion depth of a tool accommodated in a spindle of the machine tool, compared to a cuboidal design of the attachment or compared to a support structure of the laser measuring section that is formed from essentially right-angled subcomponents, with integrated closure pistons.

In one variant, the attachment is provided with a rotary-detent connection in which a band surrounding the light beam through opening has an annular, radially outwardly protruding collar with interruptions along its circumference. The collar together with its interruptions is dimensioned in such a way that it may sealingly engage with a diametrically oppositely formed opening in the particular leg of the support structure of the laser measuring section by insertion and twisting. The rotary-detent connection of the attachment on the support structure is detachable or lockable in both rotational directions. This allows the attachment on the support structure of the laser measuring section to be installed/uninstalled, even close to an interference contour, for example a wall of the working space.

A seal is present between the closure piston and the support structure of the laser measuring section. This seal surrounds on the one hand the light beam through opening of the attachment, and on the other hand, radially offset with respect to the light beam through opening, surrounds a pneumatic connection for the operating medium (compressed air, for example).

The closure piston has a journal and is under load from a spring assembly, so that in the neutral position of the closure piston, the journal closes the light beam through opening of the attachment transversely with respect to the orientation of the light beam through opening. Due to the pneumatic connection, the operating medium passes into a work chamber which encloses the longitudinally displaceably guided closure piston. In one variant, the closure piston and/or the cylinder bore are/is provided with a coated/finished running surface for protection from wear. The closure piston has an annular collar that seals off the work chamber toward the spring assembly. A piston seal made of sealing rubber is provided for this purpose. The work chamber is fed with the operating medium in order for the closure piston to free up the light beam through opening of the attachment. The closure piston is thus moved against the force of the spring assembly, so that the journal frees up the light beam through opening. A spring chamber that accommodates the spring assembly is closed, and thus protected from soiling. The closure piston has a valve function via which the venting of the spring chamber is controlled during opening of the piston. The air escapes through a channel in the piston and is supplied to the sealing air. This channel is closed in the neutral position of the closure piston, and is freed up after the closure piston travels a displacement path. When the light beam through opening is closed by the locking journal of the closure piston, the spring chamber is ventilated via this channel; otherwise, a negative pressure would arise.

In one variant, the seal situated between the closure piston and the support structure of the laser measuring section is designed as a rubber molded part, and takes on the functions of a resilient element for tolerance compensation, sealing against soiling, and/or sealing for the pneumatic transfer. Furthermore, in another variant the seal has detent elements for fixing the rotational position of the attachment in its use position. Due to the locking in the use position, centrally oriented mounting of the soiling protection cover in the attachment is ensured, even with poor accessibility or blind mounting of the attachment.

As a variant of such a detent element, a web is integrally formed on the rubber molded part, and is provided for engaging with a groove or hollow cavity introduced into the housing surface of the support structure. As another variant of such a detent element, a metal cylinder is provided which is pushed into the housing groove by the rubber molded part, which is used here as a pressure spring. This results in considerably greater locking than in the previously described variant. A third variant uses a separate resilient detent element. In this case, a plastic molded part or a punched/bent clip or a spring-loaded detent ball that is to be pressed in engages with the groove or hollow cavity introduced into the housing surface of the support structure.

In one variant, the seal presented here has different cross-sectional shapes. This results in areas with different contact pressures. Uniform contact with the housing surface of the support structure may thus be achieved, even when the attachment is asymmetrically fixed by the rotary, slide, or detent connection.

In another variant, a measuring system for contactless measurement, including a light barrier measuring system with a light transmitter and a light receiver, has an optical lens arrangement, associated with the light transmitter and/or the light receiver, for shaping and focusing a light beam from the light transmitter to the light receiver. The optical lens arrangement is accommodated in a lens mount. The lens mount has an inner and an outer sleeve, which in each case is cylindrical, the lens arrangement being inserted into the inner sleeve, which is at least partially enclosed by the outer sleeve. The lens mount together with the lens arrangement is accommodated in a wall of the light transmitter and/or of the light receiver.

This optical arrangement allows achievement of optical feedback (APC), in that a portion of the light power generated by the light emitter is irradiated onto a photoelement integrated into the light emitter, and this photoelement generates a current that is proportional to the generated power. This current, which is proportional to the generated power, is used to regulate the forward current through the light emitter. Alternatively, a constant current (ACC) flows through the light emitter by holding the forward current at a certain value.

An output-regulated or output-stabilized laser diode is used as the light emitter. The light therefrom is supplied to the optical lens arrangement, with an axial offset. This optical lens arrangement has, for example, a spherical or aspherical lens made of glass or plastic, or a combination of both materials. The optical lens arrangement may also be a light-diffracting element. The optical lens arrangement collimates, diverges, or converges the light passing through. The spreading of the light is limited by a diaphragm, which is inserted into the optical lens arrangement or which may be situated downstream from same. A rotationally symmetrical or partially rotationally symmetrical intensity distribution or a circular beam profile is achieved by use of the diaphragm. Downstream from this diaphragm, the light is collimated, diverged, or focused onto a desired focus position by a spherical or aspherical lens made of glass or plastic or a combination of both materials, or by a light-diffracting element. The optical lens arrangement may be designed as a singlet, doublet, or triplet.

In one variant, this arrangement provides a mounting sleeve, which in addition to fixing the lens may also be used as a diaphragm for delimiting the laser beam. The lenses may be inserted into this inner sleeve or mounting sleeve with little or no force. The inner sleeve thus geometrically fixes the lens arrangement and/or acts as a diaphragm for delimiting the light beam. In contrast to conventional lens mounts, with the approach proposed here the lenses (also without plastic) may be mounted centrally with precision and free of play; as a result of few parts to be installed, this allows simple, quick assembly using the pressing operation.

In one variant, the inner and/or the outer sleeve have/has weakening and/or expansion zones extending in the longitudinal direction. In one variant, the inner sleeve and/or the outer sleeve have/has radially inwardly oriented pressing points distributed on the inner and/or outer circumference. The lenses of the lens arrangement are hereby inserted into the inner sleeve. The inner cross section of the outer sleeve and the outer cross section of the inner sleeve are dimensioned with respect to one another in such a way that the outer sleeve presses the inner sleeve against the lenses in the radial direction. In another variant having multiple lenses, a separate inner sleeve may also be provided for each of the multiple lenses. In this variant, the arrangement of the lenses relative to one another is determined by the accommodation of the respective inner sleeve in the outer sleeve.

The interior pressing points or ridges press against the lens outer diameter, and due to their plastic deformation form sealing clamping of the lens outer surface. This easily mounted arrangement manages without screws or clamping rings, in contrast to conventional lens mounts. The two sleeves do not require adhesive; the parts are easy to manufacture, and the overall arrangement requires only a small number of parts.

The geometrical design of the inner sleeve and the material selection affect the forces that act on the lenses. Stresses are introduced into the glass body that are high enough that reliable fixing and optionally sealing are achievable without chipping on the lenses or optical distortions resulting.

To be able to compensate for the manufacturing tolerances of the individual components and to keep the pressing forces against the lenses and against the outer sleeve in the desired range under many different tolerance configurations, a material is to be selected that plastically deforms during the mounting but still maintains sufficient residual stress.

The outer sleeve may have at least one insertion bevel on one end, preferably having a bevel angle of 2° to 15°, particularly preferably having a bevel angle of 4° to 10°. The inner sleeve (mounting sleeve) contracts when the outer sleeve, which may also be used as a housing for the entire optical arrangement, is slid over or pressed on. These "gently sloped" insertion bevels facilitate sliding the sleeve over the lenses. The lenses are thus clamped from the outside.

The inner and/or the outer sleeve may be made of material having varying strength or ductility, with different portions that are plastically and elastically deformable, such as aluminum, plastic, nonferrous metal, lead, shape-memory alloy, in each case with differing degrees of hardness. The inner as well as the outer sleeve may be provided with weakened points (depressions, recesses, slits, openings, or the like) for dimensioning and for progression modeling of the strength, elasticity, and deformability. An additionally inserted sealing element made of rubber or plastic, or an adhesive, may be provided between the lenses and the inner sleeve and/or between the inner and the outer sleeve, or between the lens and the outer sleeve. Sealing off from the lens and from the outer sleeve results due to the pressing forces of the mounting sleeve. An additionally inserted sealing element made of rubber or a plastic molded part may provide additional sealing here. Lastly, for play-free pressing, any gap between the outer sleeve and the lens arrangement may be filled with an adhesive instead of using the sealing element. For play-free pressing, the remaining gaps may also be filled with a plastic in order to increase the strength and to provide additional sealing.

The approach presented here of providing the optical lens arrangement, associated with the light transmitter and/or the light receiver, in the lens mount allows precise, rapid, and operationally reliable lens assembly. The mechanical fixing of the optical lens arrangement in the lens mount and the sealing may be achieved in a single work step. Stable, play-free mounting of the optical components is thus achieved overall, and the completely mounted arrangement is insensitive to vibrations. The small number of required parts results from dispensing with spacing rings or screwed-in clamping rings or the like.

Further features, properties, advantages, and possible modifications of this measuring system are explained in the following description, with reference to the appended drawings.

BRIEF DESCRIPTION OF THE DRAWINGS

FIG. 4b shows different variants of SMT spring contacts in a schematic perspective view for the second variant from FIG. 4a.

FIG. 4c shows a second variant of an electrical signal transfer point of the multipurpose interface socket from FIG. 2 in a schematic sectional view from the side.

FIG. 4d shows a third variant of an electrical signal transfer point of the multipurpose interface socket from FIG. 2 in a schematic sectional view from the side.

FIG. 4e shows a fourth variant of an electrical signal transfer point of the multipurpose interface socket from FIG. 2 in a schematic sectional view from the side.

FIGS. 5 and 6 are sectional views of the attachment in FIG. 7 along the line A-A in FIG. 7.

DETAILED DESCRIPTION OF THE MEASURING SYSTEM

Figure 1:
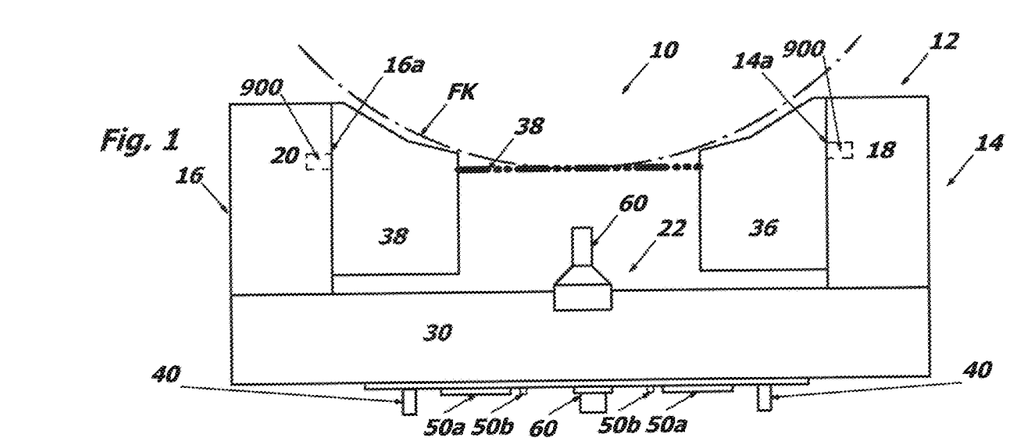
FIG. 1 shows a measuring device in the form of a contactlessly measuring light barrier in a schematic side view.

FIG. 1 shows a measuring device 10 for contactless measurement on stationary and rotating tools in a machine tool. The machine tool may be a milling/turning machine or a lathe/milling machine, for example, in which tools for machine cutting or material-removing machining are clamped. Stationary tools are indexable cutting inserts for turning operations, for example, and rotating tools are drills or milling cutters, for example.

To measure both types of tools with high precision (for example, 1 μm or greater), the measuring device 10 is equipped with a light barrier system 12 for determining the position of a tool (not shown) or for determining the longest cutting edge of a rotating tool (not shown) in the machine tool.

In a tactilely measuring measuring device, for various measuring tasks the tool is moved by the machine tool past a stylus of the measuring device or moved away from same. A light barrier system 12 and the aspects thereof are explained in greater detail below. However, a number of aspects that do not relate to the particular features of a light path still apply for tactilely measuring measuring devices.

The light barrier system 12 in the measuring device (light barrier measuring system) 10 is divided into a light transmitter portion 14 and a light receiver portion 16, each respectively associated with a leg 18, 20 of an essentially U-shaped support structure 22 of the measuring device 10. As shown in FIG. 1, the light transmitter portion 14 and the light receiver portion 16 are situated in a respective leg 18, 20 of the U-shaped support structure 22. The light transmitter portion 14 and the light receiver portion 16 face one another, and a light beam 24, in the present example a laser beam, passes through a respective passage opening 14a, 16a (not illustrated in FIG. 1) from the light transmitter portion 14 to the light receiver portion 16. The essentially U-shaped support structure 22 of the measuring device 10 is assembled from multiple cuboidal sections.

For determining the position of a tool or for determining the longest cutting edge of a rotating tool in the machine tool, according to one measurement specification (of several), the rotationally drivable tool is positioned in the laser light measuring beam 24 of the light barrier system 12 in such a way that the beam path of the laser light is interrupted by the tool. The tool is subsequently moved, relative to the measuring beam 24, away from the beam path at a preferably constant speed. The tool is moved to a position in which the measuring beam 24 is no longer interrupted by the tool. Alternatively, the measurement may also take place by pushing; the rotating tool is hereby situated outside the measuring beam 24 and generates a measuring signal as soon as the measuring beam 24 is obscured.

A signal electronic circuit (not illustrated in greater detail) for signal shaping and relaying signals to a machine controller of the machine tool is accommodated inside the housing of the light receiver portion 16. The signal electronic circuit is used to receive measuring signals from the light barrier system 12 and relay them to the machine controller (not illustrated in greater detail).

Pneumatic connections to the components of the measuring system 10 to be supplied with compressed air are provided in a connecting block 30 between the two legs 18, 20 of the U-shaped support structure 22.

Figure 2:
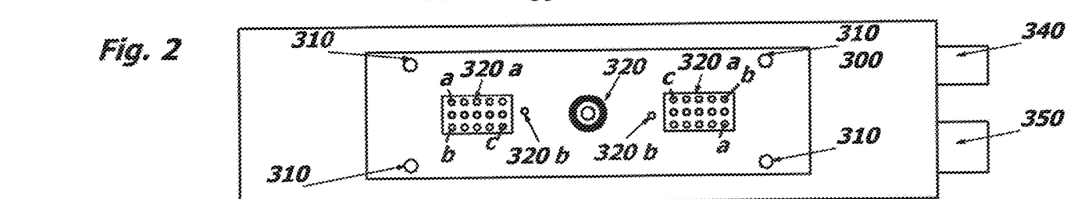
FIG. 2 shows a multipurpose interface socket for the measuring device from FIG. 1 in a schematic top view.

A multipurpose interface socket 300, illustrated in FIG. 2, is provided for communicating with the machine controller of the machine tool, i.e., transmitting measuring signals from the light barrier system 12 to the machine controller on request by the machine controller, and for electrically and pneumatically controlling the measuring system for the measurement.

This multipurpose interface socket 300 has a mechanical stop 310, corresponding to a counterstop on the measuring device 10, for accommodating and repeatably placing the measuring device on the multipurpose interface socket 300. In this variant, the stop 310 is formed by four receptacles 310, situated on the top side at right angles relative to one another, for journals 40 that are present on the base of the measuring device 10.

This multipurpose interface socket 300 has two second signal transfer points 320a, 320b which correspond to first signal transfer points 50a, 50b on the light barrier measuring system. The signal transfer points 50a, 320a are electrical contacts, and the signal transfer points 50b, 320b are fiber optic contacts.

In addition, this multipurpose interface socket 300 has a second fluid transfer point 330 on the multipurpose interface socket 300 which corresponds to a first fluid transfer point 56 on the light barrier measuring system.

This multipurpose interface socket 300 thus forms a mechanical connection, an electrical/optical signal connection, and/or a pneumatic fluid connection between the machine controller of the machine tool and the measuring system. In addition to the variant described above, the mechanical interface may also be designed, for example, as a screw, detent, rotational, or clamp fixing means, or as a dovetail or bayonet connection. This interface provides mechanically repeatable measuring device placement.

In other variants, the journals 40 may also be designed as pretensioned pins, alignment pins, or dowel pins. They are thus able to compensate for fairly small tolerances between the multipurpose interface socket and the light barrier measuring system. In further variants, the multipurpose interface socket 300 may also have one or more surface-finished contact surfaces that cooperate with correspondingly shaped countersurfaces on the measuring system.

The mechanical stop, due to its point-symmetrical arrangement of the individual transfer points in relation to a center (in the present case, a central pneumatic connection), is designed in such a way that the measuring device 10 is to be connected to the multipurpose interface socket 300 in two different orientations that are rotated by 180°.

Figure 3:
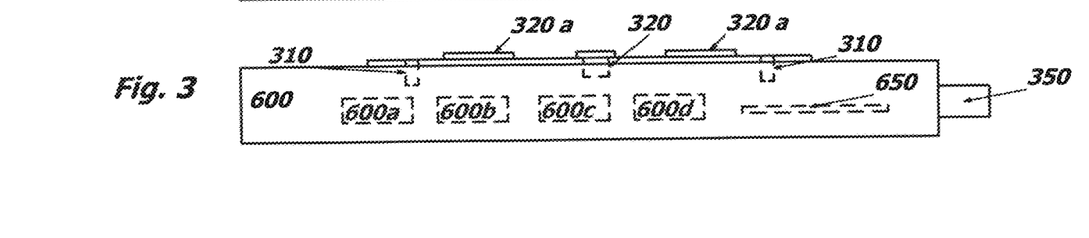
FIG. 3 shows the multipurpose interface socket from FIG. 2 in a schematic side view.

For the multipurpose interface socket 300, in the variant shown in FIGS. 2 and 3 the second signal transfer point has a first and a second contact point 320a, each having multiple contacts a, b, c. These contacts a, b, c are electrical (ohmic) contacts. In addition, two signal transfer points 50b, 320b are optionally designed as fiber optic contacts. The first and the second contact point 320a are spaced apart from one another, and the multiple contacts a, b, c of the one contact point 320a are situated point-symmetrically with respect to the multiple contacts a, b, c of the other contact point 320a, relative to a center between the two contact points (in the present case, in the center of the second fluid transfer point 330).

The light barrier measuring system 10 has diametrically opposed first and second contact points 50a, 50b. Connecting the light barrier measuring system 10 to the multipurpose interface socket 300 is thus possible in two different orientations that are rotated by 180°. For this purpose, the journals 40 of the measuring system 10 are inserted into the receptacles 310 so that the first and second contact points 50a, 50b of the measuring system 10 electrically and optically, respectively, contact the first and second contact points 320a, 320b of the multipurpose interface socket 300. In one design, a circuit board PCB on the measuring device 10 and on the multipurpose interface socket 300 in each case forms the sealing plane. The first and second contact points 50a, 50b of the measuring device 10 and of the multipurpose interface socket 300 are soldered to this circuit board PCB. A mechanical frame made of hard plastic 414 encloses the contacts. The circuit board PCB has copper tracks, not illustrated in greater detail, via which the associated contacts of the contact points are combined and the electrical signals/supply voltages are relayed. The circuit board PCB and a carrier plate or a housing portion 416 act to seal off the measuring device 10 and the multipurpose interface socket 300. This approach is also implementable using standard spring contact pins or such multiple blocks.

Figure 4A:
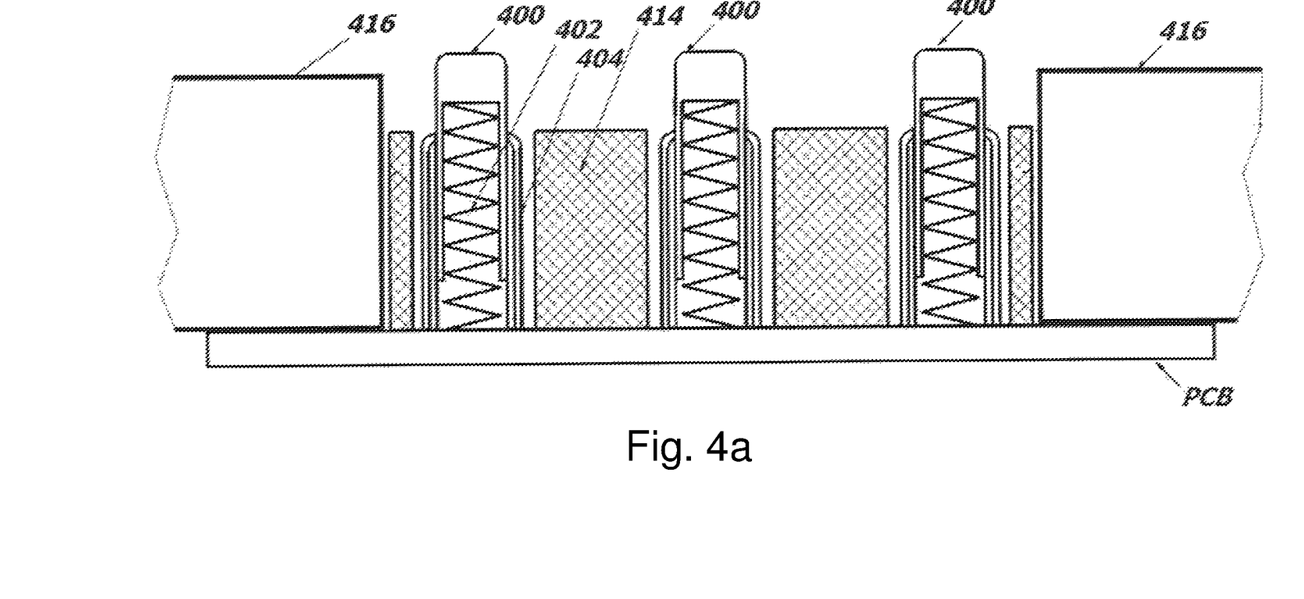
FIG. 4a shows a first variant of an electrical signal transfer point of the multipurpose interface socket from FIG. 2 in a schematic sectional view from the side.

FIG. 4a illustrates one variant of the electrical contact points. These electrical contact points are formed by multiple tubular contact pins 400, which are accommodated, pretensioned by a compression spring 402, in a sleeve 404. Each contact pin 400 has a contact piece on its free end. The individual electrical contact pins are spaced apart from one another by a plastic molded part 414 that encloses them, and are fixed in position in the housing 416 by means of the printed circuit board PCB.

Figures 4B, 4C, 4D, 4E:
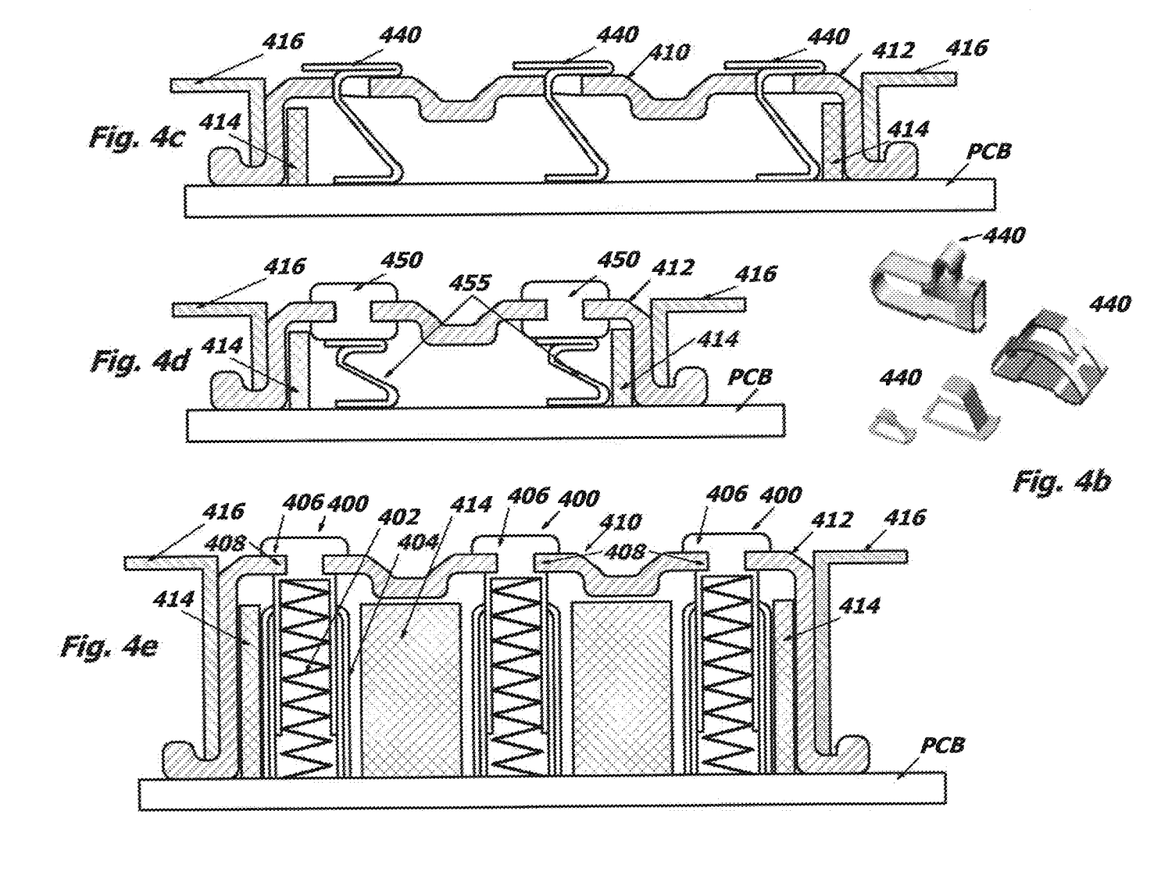

FIG. 4b shows different variants of SMT-fitted contact springs, which may be used instead of the tubular contact pins 400 that are pretensioned by the compression spring 402.

Instead of this contact field described above, FIG. 4c shows a sealed-off variant based on SMT-fitted contact springs having an approximate z shape in the side view. FIG. 4d shows contact pads 450 which are inserted into the rubber molded part 410 and implemented as riveted contacts, and which in this variant contact copper tracks, not illustrated in greater detail, on the circuit board PCB via contact springs 455 that are approximately z-shaped in the side view. The electrical contact points are enclosed by a plastic molded part 414. The electrical contact points may be easily blown off with compressed air due to the covering rubber molded part 410. It may thus be ensured that during mounting of the measuring device 10 on the multipurpose interface socket 400, no metal chips, coolant droplets, or the like are present at the contact points or cause damage to the mechanical stop, the electrical contact points, or the fluid transfer point.

FIG. 4e illustrates another variant of the electrical contact points. In this variant, multiple contact pins 400, pretensioned by a compression spring 402, are accommodated in a sleeve 404. Each contact pin 400 has a mushroom-shaped contact piece 406 with a constriction 408, similar to the contact pads 450 in FIG. 4d. A covering rubber molded part 410 is accommodated under tension in this constriction 408, and also encloses the constrictions 408 of the other contact pins 400. The rubber molded part 410 is bent downwardly at its outer edge 412. The electrical contact points are sealed off from the outside in such a way that only the mushroom-shaped contact pieces 406 are exposed. The individual electrical contact points are spaced apart from one another and fixed in position by this enclosing plastic molded part 414. The electrical contact points may be easily blown off with compressed air due to the covering rubber molded part 410. Thus, no interfering metal chips, coolant droplets, or the like are present at the contact points or the mechanical stop during mounting of the measuring device 10 on the multipurpose interface socket 400.

In one variant, the multipurpose interface socket 300 or the support structure 22 of the measuring system 10 has a pneumatic controller 600 comprising pneumatic components such as valves 600a, throttles or pressure reducers 600b, check valves 600c, filter capsules 600d, or the like, for providing pressurized fluid for various functions in the light barrier system. If the multipurpose interface socket 300 contains the pneumatic controller 600, a fluid transfer point is to be provided for each of the pneumatic functions.

For example, one of these functions is a closure diaphragm, to be pneumatically actuated, for the measuring beam 24 in the light barrier system. This closure diaphragm (see the description of FIG. 5, 6 below for details) is mounted in each attachment 36, 38 on the two legs 18, 20 of the U-shaped support structure 22 of the measuring system 10 (see FIG. 1). Another of these pneumatic functions is a fluid blowing device having a blow nozzle 60 (see FIG. 1) for supplying cleaned compressed air at approximately 2 to 10 bar from the fluid blowing device for cleaning a tool to be measured, and for cleaning the probe surface of a measuring probe assembly (in the case of a tactile measuring device), to a measuring location on the probe element and/or in the area of the measuring beam (in the case of a contactlessly measuring measuring device). A further pneumatic function is an air barrier situated in the light transmitter portion and/or the light receiver portion of the light barrier system.

In addition to the pneumatic controller 600, the multipurpose interface socket 300 has an electronic controller 650 for providing control signals for operating the light barrier system, for receiving measuring signals from the light barrier system, for delivering measuring signals in a signal transmission medium to the machine controller, and/or for providing control signals for the pneumatic controller in the multipurpose interface socket. The multipurpose interface socket 300 has an electrical connection 340 and a pneumatic connection 350. In another variant, the laser electronics system is housed in the laser system 22. The electrical controller for the pneumatic valves is housed in the multipurpose interface socket 300. The electrical controller for the pneumatic valves may also be housed in the laser measuring system 10.

In the variant illustrated in FIGS. 1 through 3, the measuring system 10 is supplied via pneumatic lines 330, 330a, 330b through the multipurpose interface socket 300, one of which also supplies a blow nozzle 60 for tool cleaning with compressed air, situated at the measuring system 10, via the multipurpose interface socket 300. In the variant illustrated in FIG. 3, the pneumatic valves are housed in the multipurpose interface socket 300. In this case, the three pneumatic transfer points 330, 330*a*, 330*b* are likewise designed to be turnable by 180°.

Figure 5:
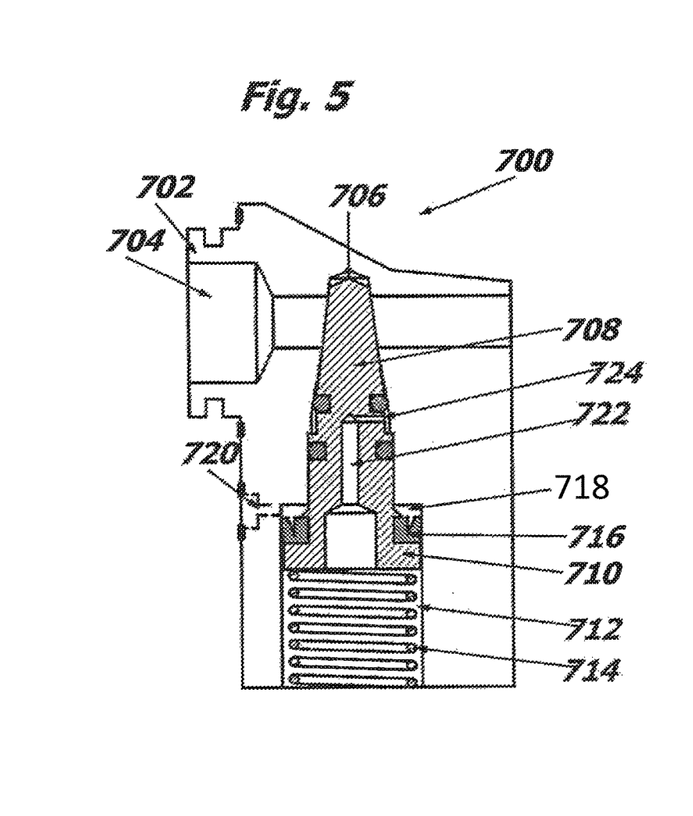
FIG. 5 shows an attachment with a pneumatically operated closure piston for the measuring device in its closed position, in a schematic sectional view from the side.
Figure 6:
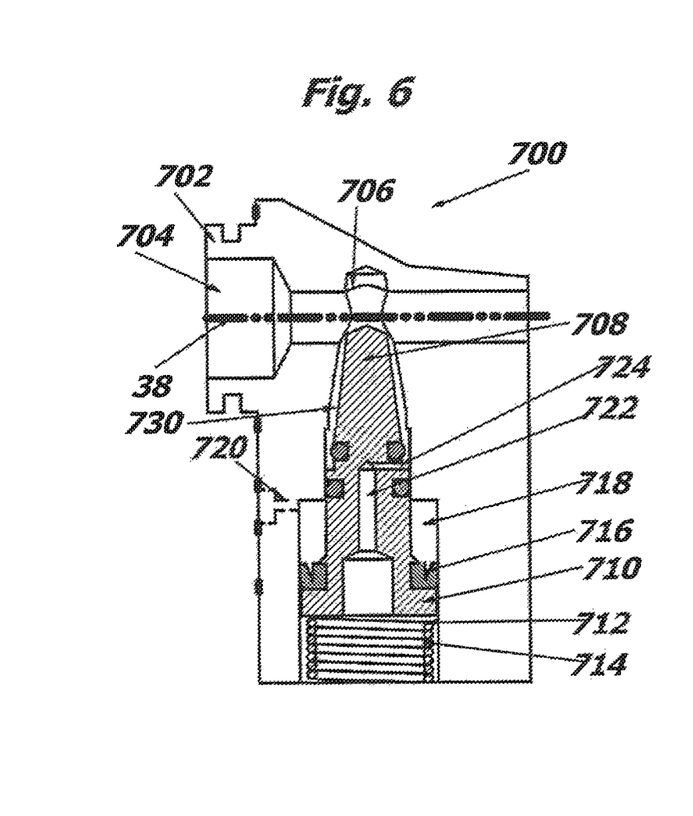
FIG. 6 shows the attachment with the pneumatically operated closure piston for the measuring device in its throughflow position, in a schematic sectional view from the side.
Figure 7:
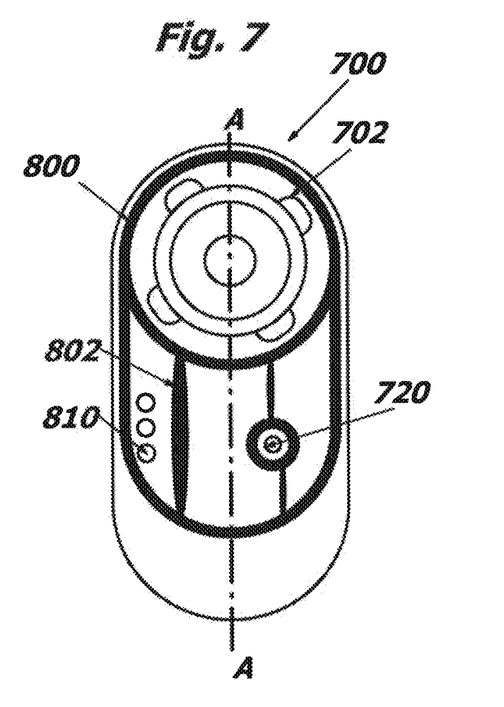
FIG. 7 shows the attachment from FIG. 5 in a schematic top view.

FIGS. 5 through 7 illustrate one variant of pneumatic closure pistons or closure diaphragms 700 for the measuring system, which protect the laser measuring section from soiling. Such a closure piston is situated in each of the attachments 36, 38. FIG. 5 shows the closure piston 700 in its closed position, and FIG. 6 shows the closure piston 700 in its throughflow position. FIGS. 5 and 6 are sectional views of the attachment in FIG. 7 along the line A-A in FIG. 7.

Conventional soiling protection covers for these types of laser systems are easily screwed on. Depending on the intensity of the contaminant loading present in the application and the cleanliness of the sealing air, the soiling protection covers must be removed and the beam entry/exit points cleaned. This is time-intensive and requires a tool. The closure pistons/closure diaphragms 700 presented here, with a rotary, slide, bayonet connection, etc., on the measuring system 10 may be removed and mounted without tools.

These closure diaphragms 700 prevent dust, chips, drilling fluid, or the like from being able to penetrate into the through openings for the measuring beam during extended down times of the measuring system. Each of the attachments 36, 38 has a bayonet coupling 702 that is lockable in the clockwise and anticlockwise positions in order to mount the particular attachment 36, 38 on the corresponding leg 18, 20. This bayonet coupling 702 encloses a through opening 704 through which the laser beam may enter and exit. The sealing air is also led through this through opening. The through opening 704 has a blocking channel 706, transverse to its longitudinal extension, in which a conical locking journal 708 is longitudinally displaceably accommodated. The locking journal 708 has an annular collar 710 on its lower end, against which a compression spring 714 present in an externally closed-off spring chamber 712 acts downwardly in order to push the locking journal 708 into its closed position (FIG. 5). The annular collar 710 bears a sealing ring 716 on its top side which delimits a pressure chamber 718. This pressure chamber 718 has a fluid channel 720 that communicates with a corresponding connection on the corresponding leg 18, 20 in order to introduce compressed air from the multipurpose interface socket 300 into the pressure chamber 718, or discharge compressed air from same, in a controlled manner.

The locking journal 708 has a central channel 722 that extends from the spring chamber 712 to a lateral outlet 724. When the compressed air in the pressure chamber 718 pushes the locking journal 708 from its closed position into its throughflow position, the air in the spring chamber 712 would be compressed, which is disadvantageous. A spring chamber 712 that is open to the outside entails the risk of chips, dust, or the like penetrating. Therefore, the spring chamber 712 is ventilated through the locking journal 708 into the through opening 704 when the locking journal 708 leaves its closed position. The upper seal leaves the cylindrical section of the blocking channel 706 after traveling approximately 1 mm. As a result, an annular gap 730 in the blocking channel 706 is formed around the locking journal 708, so that the air can escape from the spring chamber 712 and into the through opening 704. When the closure diaphragm 700 is open, this through opening 704 is fed with compressed air from the corresponding leg 18, 20; the compressed air can escape through the through opening 704 and likewise prevents the penetration of chips, dust, or the like. Thus, the through openings 704 of the measuring beam are also sealed off in the blocked position, and are open in the throughflow position, in which the protective/closing devices at the light transmitter portion or the light receiver portion of the light barrier system are fed with compressed air, so that the measuring beam can enter and exit at its passage openings without interfering substances being able to penetrate. In another variant, the valve site is formed by a short cylindrical end of the locking journal 708 with an interior vent channel in the neutral position being inserted into a seal. After the locking journal 708 travels a short path, the vent channel is freed from its neutral position by the seal, so that the air can escape from the spring chamber 712 and into the through opening 704. When the closure diaphragm 700 is open, this through opening 704 is likewise fed with compressed air from the corresponding leg 18, 20; the compressed air can escape through the through opening 704, and likewise prevents the penetration of chips, dust, or the like.

A seal 800 is present between each attachment 36, 38 with the closure piston 700 and the U-shaped support structure 22 of the measuring system 10 at the two legs 18, 20. This seal 800 on the one hand surrounds the light beam through opening and the sealing air through opening 704 of the attachment 36, 38, and on the other hand, radially offset with respect to the light beam through opening 704, surrounds the fluid channel 720, which communicates with the corresponding pneumatic connection for the compressed air. In addition, the seal encloses optical fibers 810 for displaying operating states of the measuring system 10.

The seal 800 is designed as a rubber molded part, and is used for tolerance compensation, sealing against soiling, and sealing for the pneumatic transfer. The tolerance compensation here refers to different variants of the soiling protection cover fixing, since some embodiments (bayonet or dovetail, for example) require a resilient element. A sealing section 802 of the seal 800 is used as a detent element for fixing the rotational position of the attachment in its use position. When the attachment is twisted around the light beam through opening 704, this sealing section 802 engages with the bayonet lock for locking into a diametrically oppositely shaped groove (not illustrated in greater detail) on the two legs 18, 20 of the U-shaped support structure 22, thus fixing the position of the attachment on the particular leg 18, 20. Correct mounting of the soiling protection cover in the attachment is ensured due to this engagement of the sealing web with the groove in the use position.

Figure 8:
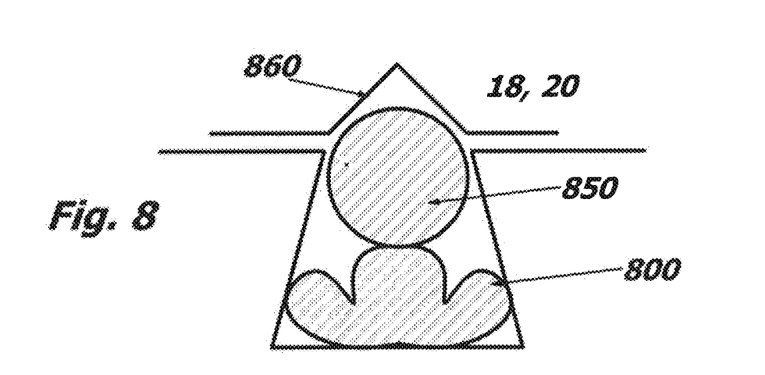
FIG. 8 illustrates one variant of a detent element for the attachment on the support element.

In FIG. 8, as a further variant of such a detent element, a metal cylinder 850 is provided, which is pushed into the groove 860 at the two legs 18, 20 of the U-shaped support structure 22 by the rubber molded part 800, which acts as a pressure spring here. This results in considerably greater locking than in the variant described above.

In one variant, the seal presented here has different cross-sectional shapes. This results in areas with different contact pressures. Uniform contact with the housing surface of the support structure may thus be achieved, even when the attachment is asymmetrically fixed by the rotary, slide, or detent connection.

As shown in FIG. 1 and in FIGS. 5 through 7, the light beam through opening is situated in the attachment in such a way that in the mounted state of the attachment on the laser measuring section, the light beam through opening is closer to a free, upper end of the particular leg of the support structure 22 of the laser measuring section 10 than to the lower end of the multipurpose interface socket 300. The attachment has a sloped contour or wall 780 on its side closer to the upper end. As illustrated in FIGS. 5 and 6, the sloped upper wall due to its bent contour tapers the attachment in such a way that a tool having the circular path FK indicated by a dashed-dotted line in FIG. 1 is able to satisfactorily reach the laser beam 38.

Figure 9:
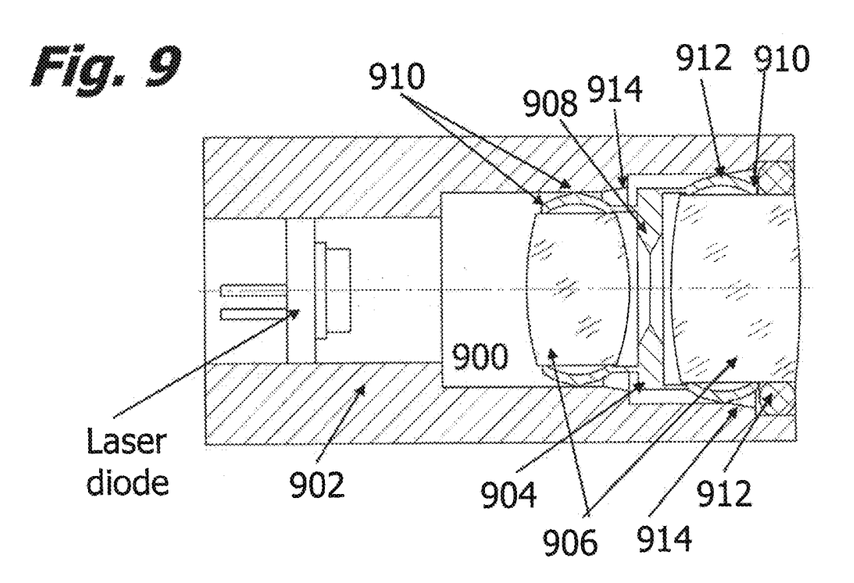
FIG. 9 illustrates a first variant of a lens mount in a leg of a support structure.

The measuring system has a light transmitter and a light receiver, not illustrated in greater detail, in the light barrier measuring system. An optical lens arrangement for shaping and focusing the (laser) light beam from the light transmitter to the light receiver is associated with the light transmitter. The light receiver here is designed without an optical lens arrangement, and has only a protective glass and a pinhole diaphragm. FIG. 9 shows one of multiple variants in which the optical lens arrangement is accommodated in a lens mount 900. The lens mount 900 has an outer cylindrical sleeve 902 and an inner cylindrical sleeve 904. The lens arrangement 906 is inserted into the inner sleeve 904, which is enclosed by the outer sleeve 902. The lens mount 900 together with the lens arrangement is accommodated in a wall of the light transmitter. Instead of the lenses, an optically inactive protective disk is inserted into the light receiver. The inner sleeve 904 geometrically fixes the lens arrangement 906. The inner sleeve also has a diaphragm 908 for delimiting the light beam.

In the variant illustrated in FIG. 9, the outer sleeve 902 is rigid and dimensionally stable relative to the inner sleeve 904, whereas the inner sleeve 904 is elastically or plastically deformed when it is introduced into the outer sleeve 902. For this purpose, the mounts of the lenses have a cambered design, so that a ring having a convexly arched cross section clamps the particular lens close to its corners. At its center the ring has a maximum diameter, with which it pushes against the inner wall of the outer sleeve 902. The inner sleeve 904 is deformable due to the camber of the mount. Weakening/expansion zones 910, 912 are thus implemented, which are designed as radially outwardly or inwardly oriented pressing points that are distributed at the inner and outer circumference on the inner sleeve and/or the outer sleeve.

The lenses of the lens arrangement are inserted into the inner sleeve 904. The inner cross section of the outer sleeve 902 and the outer cross section of the inner sleeve 904 are dimensioned with respect to one another in such a way that the outer sleeve pushes the inner sleeve against the lenses in the radial direction.

Figure 10:
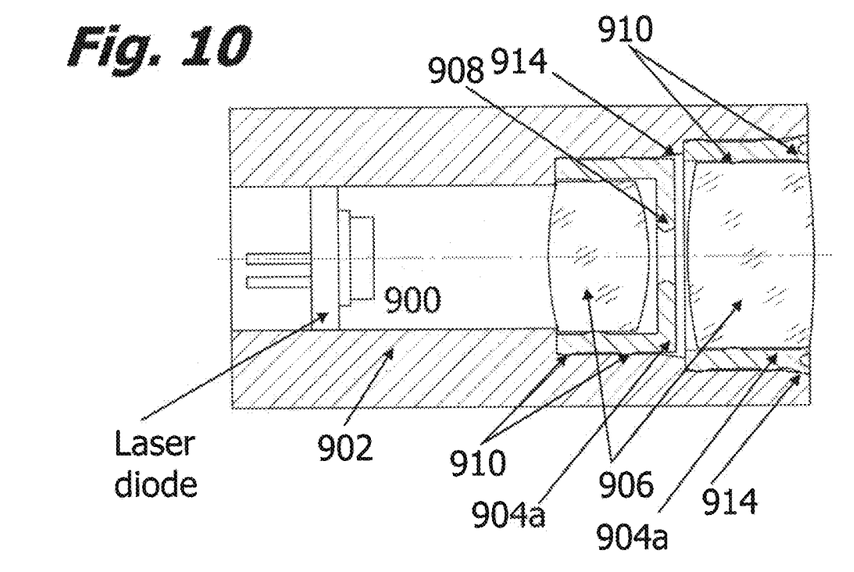
FIG. 10 illustrates a second variant of a lens mount.

FIG. 10 illustrates a variant in which a sealing lip that is integrally formed on the inner sleeve is provided instead of the separate seal. In this variant, each lens of the lens arrangement 906 has a separate inner sleeve 904a, 904b. In this case, the spatial configuration of the lenses in the outer sleeve determines their position relative to one another. The diaphragm 908 for delimiting the light beam may also be inserted separately into the outer sleeve, or may be part of one of the inner sleeves.

The outer sleeve 902 has insertion bevels 914 having a bevel angle of approximately 8°. This facilitates sliding the outer sleeve over the inner sleeve. In the variant shown, the inner and the outer sleeve are made of plastic material having varying strength or ductility, with different portions that are plastically and elastically deformable. Aluminum or some other material may also be used instead of the plastic. In another variant, an additionally inserted sealing element 916 made of rubber or plastic, or an adhesive, is provided between the lenses and the inner sleeve and between the inner and the outer sleeve, or between one of the two lenses and the outer sleeve 902.

The variants described below as well as their design and operational aspects are used solely for better understanding of the structure, the mode of operation, and the properties; they do not limit the disclosure to the exemplary embodiments, for example. The figures are sometimes schematic, and important properties and effects are sometimes illustrated with significant enlargement in order to clarify the functions, operating principles, technical embodiments, and features. Any mode of operation, any principle, any technical embodiment, and any feature that is disclosed in the figures or in the text may be freely and arbitrarily combined with any of the claims, any feature in the text and in the other figures, other modes of operation, principles, technical embodiments, and features that are contained in this disclosure or result therefrom, so that all conceivable combinations may be associated with the described variants. In addition, combinations between any individual statements in the text, i.e., in any section of the description, in the claims, as well as combinations between various variants in the text, in the claims, and in the figures, are also encompassed. Furthermore, the claims do not limit the disclosure, and thus the combination options, of any stated features with one another. All disclosed features are explicitly also disclosed herein, alone and in combination with all other features.

The invention claimed is:

1. A contactlessly measuring system having a measuring measuring device comprising:
    a light transmitter portion and a light receiver portion to determine a position of a tool or to determine a longest cutting edge of a rotating tool in a tool machine,
    wherein a light barrier system is formed by the light transmitter portion and the light receiver portion, the light transmitter portion and the light receive portion each being associated with a leg of an essentially U-shaped support structure of the measuring device, the light barrier system having:
    a fluid blowing device, associated with the measuring device, for cleaning a tool to be measured, and/or
    a sealing air feed in an area of a measuring beam of the measuring device designed as a light barrier measuring system, and/or
    a protective/closing device at the light transmitter portion and/or the light receiver portion of the measuring device designed as a light barrier measuring device,
    wherein the protective/closing device includes a displaceable closure piston and is detachably connected to the light barrier measuring device,
    wherein the displaceable closure piston is arranged in an attachment disposed at the light transmitter portion and an attachment disposed at the light receiver portion and includes a light beam through opening, and
    wherein each attachment has a wall which in a mounted state of each attachment at the light barrier measuring system is closer to a free, upper end of the corresponding leg of the U-shaped support structure than to a lower end of the corresponding leg of the U-shaped support structure, and
    wherein the wall is sloped with respect to a light beam from the light transmitter portion to the light receiver portion such that each attachment to the opposite leg of the U-shaped support structure is tapered.

2. The measuring system according to claim 1 further comprising a pneumatic controller including valves, throttles, check valves, filter capsules, and/or pressure reducers to provide pressurized fluid in the measuring device, wherein the pneumatic controller supplies the fluid in a controlled manner to the fluid blowing device, and/or to the sealing air feed in the area of a measuring beam of the measuring device designed as a light barrier measuring system, and/or to the protective/closing device.

3. The measuring system according to claim 2, in which for supplying the fluid blowing device, the pneumatic controller has a first, electromagnetically actuatable switch valve that is to be acted on by electrical actuating signals, wherein the first, electromagnetically actuatable switch valve delivers compressed air in a controlled manner to one or more air outlets; and/or for supplying sealing air in the area of the measuring beam, the pneumatic controller has a second, electromagnetically actuatable switch valve that is to be acted on by actuating signals; and/or for feeding the protective/closing device, the pneumatic controller has a third, electromagnetically actuatable switch valve to be acted on by actuating signals.

4. The measuring system according to claim 1, in which the protective/closing device for the light path is detachably connected to a laser measuring section, wherein the displaceable closure piston of the protective/closing device is situated in each attachment containing the light beam through opening, wherein each attachment is preferably provided with a rotary, slide, or detent connection that is configured for cooperating with a corresponding connection at the U-shaped support structure of the laser measuring section.

5. The measuring system according to claim 1, in which the displaceable closure piston is situated in the protective/closing device, and/or a switch valve delivers an operating medium in a controlled manner to one or more sliders, wherein the switch valve has a spring-loaded blocked position, in which no operating medium/fluid reaches the sliders at the light transmitter portion or the light receiver portion of the light barrier system, so that a measuring light beam cannot pass through, and an actuated throughflow position, in which the sliders are fed with the operating medium so that the measuring light beam can pass through.

6. The measuring system according to claim 1, in which the displaceable closure piston is pneumatically displaceable, and the light beam through opening is situated in each attachment in such a way that in the mounted state of each attachment at a laser measuring section, the light beam through opening is closer to a free, upper end of the corresponding leg of the U-shaped support structure of the laser measuring section than to the lower end of the leg of the corresponding U-shaped support structure, and/or each attachment has a contour or wall which, on its side closer to the upper end of the corresponding leg of the U-shaped support structure, is sloped with respect to the light beam.

7. The measuring system according to claim 1, in which a rotary, slide, or detent connection has a rotary-detent connection in which a band surrounding the light beam through opening has an annular, radially outwardly protruding collar with interruptions along its circumference, and the rotary-detent connection of each attachment on the U-shaped support structure is detachable or lockable in both rotational directions, wherein the collar together with its interruptions is dimensioned in such a way that it may sealingly engage with a diametrically oppositely formed opening in the corresponding leg of the U-shaped support structure of a laser measuring section by insertion and twisting.

8. The measuring system according to claim 1, in which a seal is situated between the displaceable closure piston and the U-shaped support structure of a laser measuring section, and surrounds on the light beam through opening of each attachment, and, radially offset with respect to the light beam through opening, surrounds a pneumatic connection for an operating medium in sealing manner.

9. The measuring system according to claim 1, in which the displaceable closure piston has a journal and is under load from a spring assembly, so that in a neutral position of the displaceable closure piston, the journal closes the light beam through opening of each attachment essentially transversely with respect to the orientation of the light beam through opening, and in an operating position of the displaceable closure piston, due to the pneumatic connection, an operating medium passing into a work chamber moves the displaceable closure piston against the force of the spring assembly, so that the journal frees up the light beam through opening, and/or wherein the displaceable closure piston is longitudinally displaceably guided, and the displaceable closure piston and/or the cylinder running surfaces are/is provided with a coated/finished running surface.

10. The measuring system according to claim 1, in which a spring chamber that accommodate a spring assembly is closed, and wherein the displaceable closure piston forms a valve via which the spring chamber is vented during opening of the displaceable closure piston, via a channel that is closed in a neutral position of the displaceable closure piston.

11. The measuring system according to claim 1, in which an exhaust air line of the displaceable closure piston and/or of a pneumatically actuated power valve for the cleaning air is led from a machine room to a machine controller, through an electrical line that establishes an electrical connection, when the displaceable closure piston is closed or when the cleaning air is switched off, or the exhaust air line of the displaceable closure piston and/or of the pneumatically actuated power valve for the cleaning air leads to a blow nozzle for tool cleaning, and an installed check valve is provided in the blow nozzle.

12. The measuring system according to claim 1, in which a seal is designed as a rubber molded part, and/or has detent elements for fixing a rotational position of each attachment in its use position.

13. The measuring system according to claim 1, in which a seal of each attachment (i) as a detent element has a web on a rubber molded part, which is provided and dimensioned for engaging with a groove or hollow cavity introduced into a housing surface of the U-shaped support structure, and/or (ii) as the detent element a metal cylinder is provided which is configured for being resiliently pushed into the groove or hollow cavity introduced into the housing surface of the U-shaped support structure, and/or (iii) as the detent element, a separate resilient plastic molded part or a punched/bent clip or a spring-loaded detent ball is configured for being pushed into the groove or hollow cavity introduced into the housing surface of the U-shaped support structure, and/or the seal of each attachment has different cross-sectional shapes along its longitudinal direction.

* * * * *